Feb. 29, 1944.   A. D. L. HUTCHINSON   2,342,939
DUMP TRUCK
Original Filed June 15, 1940   2 Sheets-Sheet 1
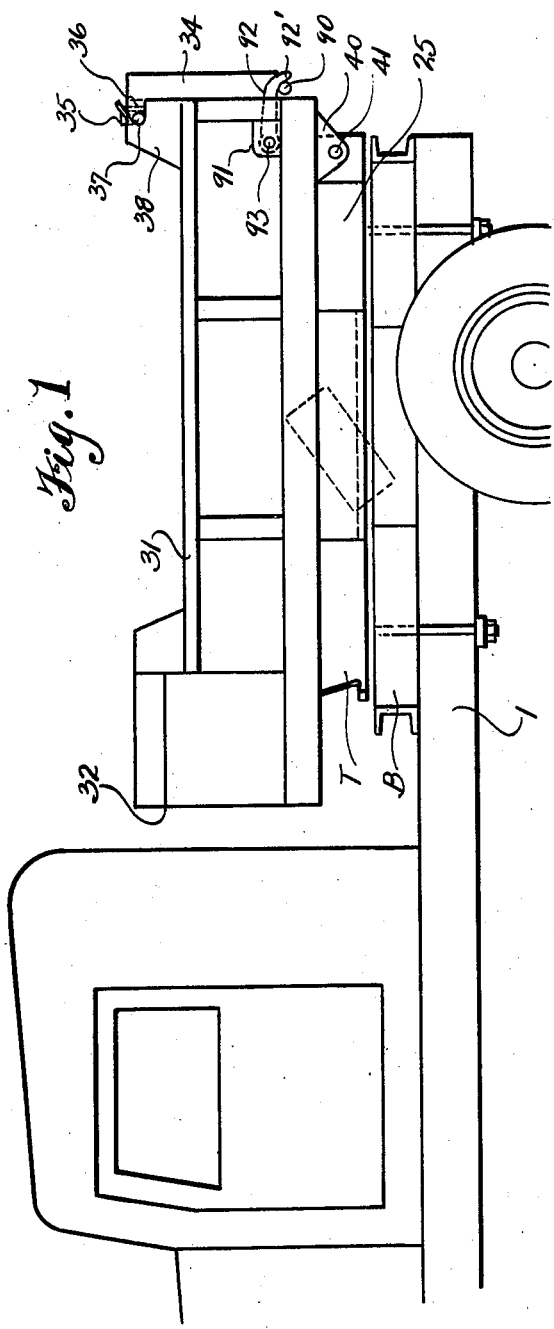
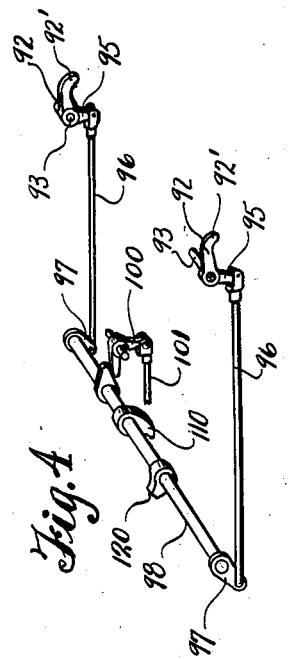
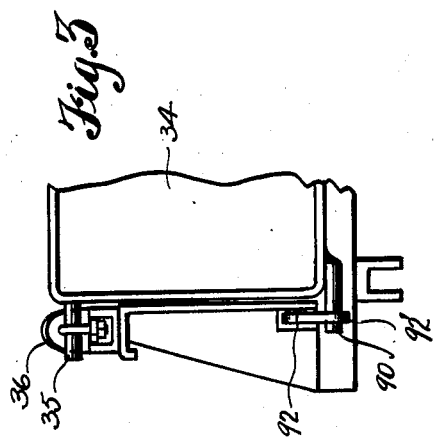
INVENTOR
A.D.L. HUTCHINSON
BY
Cook & Robinson
ATTORNEYS Feb. 29, 1944. A. D. L. HUTCHINSON 2,342,939
DUMP TRUCK
Original Filed June 15, 1940 2 Sheets-Sheet 2
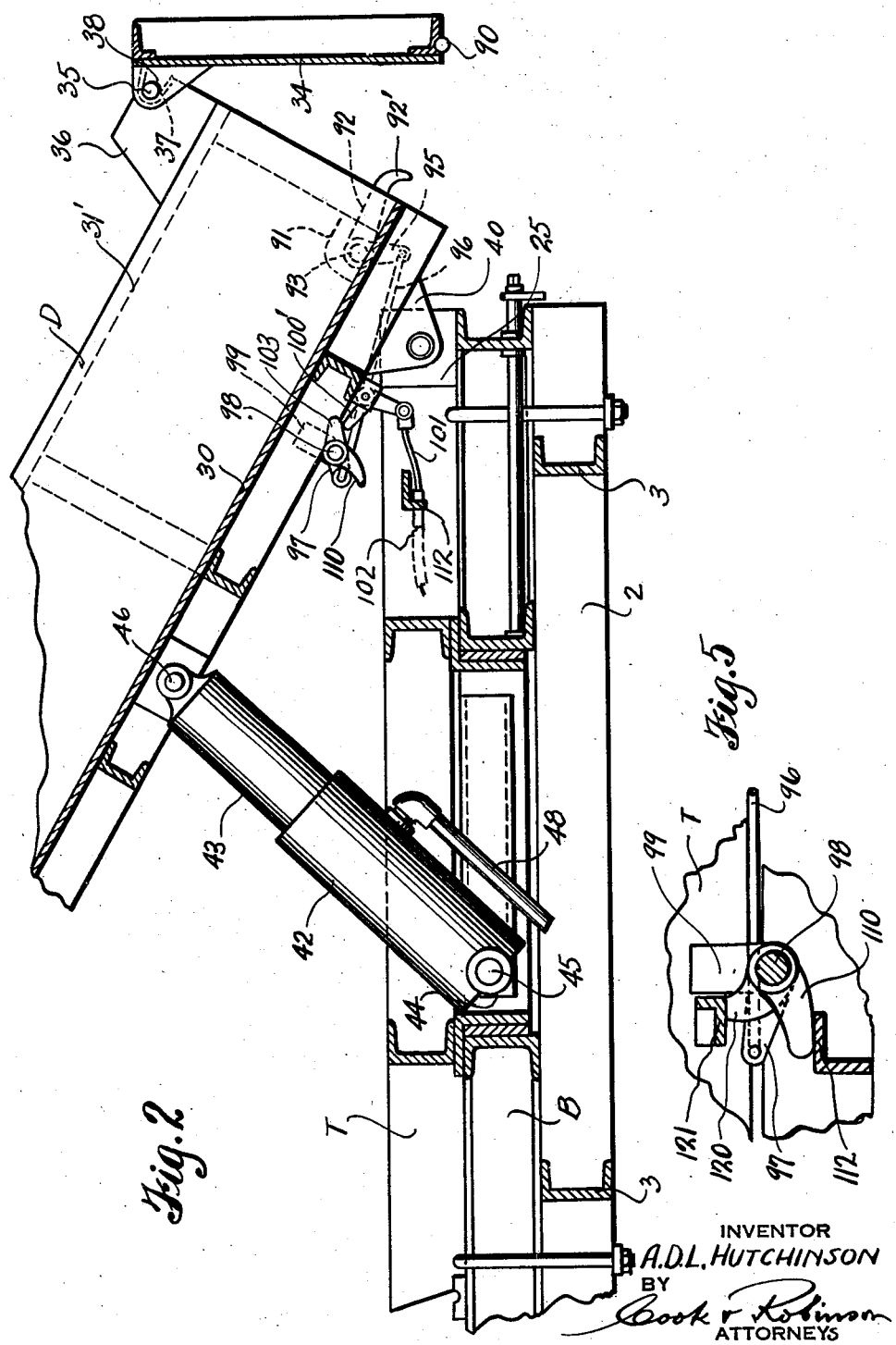
INVENTOR
A.D.L. HUTCHINSON
BY
Cook & Robinson
ATTORNEYS Patented Feb. 29, 1944

2,342,939

UNITED STATES PATENT OFFICE 2,342,939

DUMP TRUCK

Archie D. L. Hutchinson, Seattle, Wash.

Original application June 15, 1940, Serial No. 340,733. Divided and this application January 20, 1942, Serial No. 427,437

1 Claim. (Cl. 298—23)

This invention relates to dump body vehicles, and has reference more particularly to improvements in what are known in the art as "dump trucks," wherein the load carrying body is pivotally mounted and is adapted to be mechanically tilted upwardly about the pivot axis for dumping a load from the end thereof; the present invention being a divisional part of an application filed on June 15, 1940, under Serial No. 340,733, now Patent No. 2,278,446, dated April 7, 1942, and it deals with the improved latch mechanism for the tail gate of the truck body that was described and claimed in that application.

It is the principal object of this invention to provide an automatically locking and manually releasable tail gate latch mechanism.

More specifically stated, the objects of this invention reside in the provision of a hingedly suspended tail gate and a novel manually releasable latching means for locking the gate against opening, together with automatic means for positively moving the latch to gate holding position incident to the lowering of the dump body from dumping to horizontal position.

In accomplishing these and other objects of the invention, I have provided the improved details of construction, the preferred forms of which are illustrated in the accompanying drawings, wherein—

Fig. 1 is a side view of an automobile truck, equipped with a dump body and tail gate latch in accordance with details of the present invention.

Fig. 2 is an enlarged sectional view in a vertical plane, longitudinally of the truck, illustrating the pivotal mounting of the dump body; the dump body being shown in raised position and the tail gate open.

Fig. 3 is a detail, illustrating the hinged mounting of one end of the tail gate, and the latch device at that end.

Fig. 4 is a perspective view of the gate latch devices and the actuating linkage.

Fig. 5 is a detail of the gate latch mechanism.

Referring more in detail to the drawings—

While the present dump body structure is primarily intended for mounting on, and use in connection with the ordinary types of automobile trucks, it is not intended that it shall be limited thereto, since it may well be applied to rail cars and the like. In Figs. 1 and 2 of the present drawings, it has been illustrated as being mounted upon the rear end portion of an automobile truck frame which includes the two longitudinal opposite sides beams 1 and 2, and the transverse beams 3, which connect the side beams at suitable intervals to provide the necessary strength and rigidity.

The dump body, designated in its entirety by the reference character D, is mounted upon the truck frame through the mediacy of, first, a base frame structure designated in its entirety by reference character B, and second, a turn table structure, designated in its entirety by reference character T. However, this is a feature only of the particular type of truck shown and it is not the intention that the present latch mechanism be confined thereto, but that it shall be applied to all types of dump trucks regardless of whether or not they are of the turntable type.

Without going into detail with reference to the base frame and turntable construction, it will be explained that the dump body D may be of any suitable form of construction, but is here shown as comprising a base or bottom wall structure 30, vertical opposite side walls 31 and 31', and a front wall 32. At the rear end of the body is the tail gate 34, and this is swingingly suspended by means of hinge trunnions 35 extending laterally from the upper edge corners thereof; these trunnions being mounted by brackets 36 whereby they are inset from the plane of the gate, and the trunnions are pivotally contained in sockets 37 provided in brackets 38 that are fixed upon the top edges of the side walls of the body and adjacent the rear end. Since the hinge trunnions are inset from the plane of the gate, the natural tendency of the gate when the body is in lowered position, is to swing to and remain in closed position.

At the rear end of the base structure of the dump body, and symmetrically spaced at opposite sides of the longitudinal center, are downwardly extending hinge brackets 40 that are mounted by hinge pins 41 that extend through these brackets and through the rear end portions of two adjacent corner legs 25 of the frame T; thus to provide that the free end of the dump body may be swung vertically between its lowered position, as seen in Fig. 1, and the dumping position in which it is shown in Fig. 2.

Dumping actuation of the body is effected by means of a hydraulic jack, shown best in Fig. 2. This jack comprises a hydraulic cylinder 42 in which a piston portion 43 is slidably contained. The cylinder has trunnions 45 at its lower end whereby it is pivotally mounted in bearings 44 in the base frame B. The upper end of the piston portion 43 is pivotally connected by a pin 46 to parts attached to the base frame structure of the truck body. It will be understood that the arrangement of the jack is such that with the extension of the piston, the dump body will be moved about its pivotal mounting toward raised position, and when the pressure medium is released for flow from the cylinder, the body will be lowered accordingly. Hydraulic medium may be applied to the jack cylinder through a flexible hose connection 48, and could be supplied from a source of supply carried in the usual tank on the truck, and applied by a pump under control of suitable valve mechanism located convenient to the driver of the vehicle; these parts not being herein illustrated.

Next referring to the gate locking means, it will be observed that, at the two lower corners of the gate are laterally extending studs 90, and pivotally mounted in the housings 91 on the side walls of the body, are latch levers 92, mounted by pivot shafts 93. The latch levers extend rearwardly and have downturned end portions 92'. When the gate is closed, these latches are adapted to lock over the end studs 90, as noted in Fig. 1, to hold the gate closed.

Extending downwardly from the pivot shafts are lever arms 95 to which forwardly extending links 96 are pivotally attached. At their forward ends, the links have pivotal connection with lever arms 97 fixed on a cross shaft 98, rotatably supported from the base structure of the body by brackets 99.

Also, pivotally mounted on the base frame structure of the body, as noted in Fig. 2, is a bell crank lever 100, to one arm of which a cable 101 is attached. The cable is extended forwardly, through suitable guides 102, to a position accessible to the driver of the vehicle. The other arm 100' of the bell crank lever 100 extends forwardly for contact with the under side of a lever arm 103, extending rearwardly from the cross shaft 98; the arrangement being such that pull on the cable actuates the bell crank to engage arm 103 and effect a rotative movement of the cross shaft 98, which, through the linkage 96 provided, will throw the latch lever 92 upwardly to release the gate.

It is also to be noted that a cam lever arm 110 is fixed to the cross shaft 98, and upon the lowering of the body from the position of Fig. 2 to the position of Fig. 1, this cam lever arm will finally engage with a fixed stop 112 on the turn table frame, T, thereby to rotatably actuate the cross shaft 98 to effect, through the disclosed linkage, the downward actuation of the latch 92 into holding contact with the gate; it being understood that when the body is lowered, the gate automatically swings to its closed position by reason of the inset relation of its hinge axis.

A feature of this latch mechanism resides in the fact that when the cam arm 110 engages the stop 112, and rotatably actuates the cross shaft, it swings the lever arm 97 and link 96 across a dead center line relative to the shaft 98 and brings an arm 120, fixed on the shaft 98, up against an abutment 121. This positively holds the latches against release from the gate studs 90. This permits the body to be elevated for dumping, and the gate released at will of the driver by pull on the release cable 101.

Having thus described my invention, what I claim as new therein and desire to secure by Letters Patent is:

In a dump truck, a supporting frame, a dump body mounted thereon for end dumping, means on the frame for tilting the body to dumping position and for lowering it to rest, an end gate with supporting pivots at its upper edge and suspended to swing automatically to closed position when the body is returned from raised to lowered position, a latching stud on the gate, a latch lever pivotally attached to the body to engage the stud, a rock shaft rotatably mounted on the body, a lever arm on the shaft, a link operatively connecting the lever arm with the latch lever for actuating it to and from holding contact with the stud, an abutment on the frame structure, a cam arm on the rock shaft adapted to engage the abutment incident to lowering the body, thereby to rock the shaft to actuate the latch lever into holding contact with the stud; said lever arm and link passing over a dead center position with the latching operation, thereby to hold the latch lever against release, and a manually operable means for effecting rotation of the rock shaft.

ARCHIE D. L. HUTCHINSON.